United States Patent [19]

Matsushita

[11] Patent Number: 5,530,500
[45] Date of Patent: Jun. 25, 1996

[54] LENS-FITTED PHOTO FILM UNIT AND CLASSIFYING APPARATUS AND METHOD FOR THE SAME

[75] Inventor: Toshihiro Matsushita, Kanagawa, Japan

[73] Assignee: Fuji Photo Film Co., Ltd., Kanagawa, Japan

[21] Appl. No.: 262,339

[22] Filed: Jun. 17, 1994

[30] Foreign Application Priority Data

Jun. 18, 1993 [JP] Japan .................. 5-148013

[51] Int. Cl.$^6$ .................................................. G03B 29/00
[52] U.S. Cl. .................................................. 354/76; 354/288
[58] Field of Search .................. 354/297, 298, 354/334, 288, 75, 76

[56] References Cited

U.S. PATENT DOCUMENTS 5,021,811  6/1991  Maurinus et al. .................. 354/289.1
5,343,265  8/1994  Oi et al. .................. 354/288

FOREIGN PATENT DOCUMENTS

5-31648  8/1993  Japan .

*Primary Examiner*—David M. Gray
*Attorney, Agent, or Firm*—Sughrue, Mion, Zinn, Macpeak & Seas

[57] ABSTRACT

A lens-fitted photo film unit includes a housing which incorporates an exposure mechanism and is pre-loaded with photo film. A packaging cardboard covers the housing. An identification sign is disposed outside the housing in externally readable fashion, and signals information of one kind of the housing. In classification of the photo film unit, the packaging cardboard is removed from the housing. The identification sign is read, to detect the one kind of the housing. Three downstream paths are disposed and respectively associated with three kinds of housings. The housing is transferred to one of the downstream paths in association with the detected one kind. In a preferred embodiment, the identification sign includes a combination of smooth and rough faces, which are different in optical reflectance from one another. The combination constitutes the information of the one kind of the housing. Preferably, a lower critical value is determined for a surface roughness of the rough face. A lower critical ratio in surface roughness is determined between the smooth and rough faces.

4 Claims, 7 Drawing Sheets

LENS-FITTED PHOTO FILM UNIT AND CLASSIFYING APPARATUS AND METHOD FOR THE SAME

BACKGROUND OF THE INVENTION

1. Field of the Invention

The present invention relates to a lens-fitted photo film unit and classifying apparatus and method for the same. More particularly, the present invention relates to an improvement in which plural kinds of lens-fitted photo film units can be classified with great ease.

2. Description Related to the Prior Art

A known lens-fitted photo film unit (hereinafter referred to simply as photo film unit) is disclosed in JP-U (Japanese Utility Model Laid-open Publication No.) 1-128241 for example, and is now on the market, e.g. under the trade name "Fujicolor Quick Snap +3" (manufactured by Fuji Photo Film Co., Ltd.). Such photo film units are a single-use camera pre-loaded with photo filmstrip (hereinafter referred to as photo film). The photo film unit is sold at a low price as compared with a conventional camera. When a user purchases the photo film unit, he can carry it with him with great portability, and take photographs whenever he desires. There have been a number of different variants of commercially available photo film units, such as a flash built-in type "Fujicolor Quick Snap Flash" for exposures at night or in a room, a panoramic type "Fujicolor Quick Snap Panoramic" for exposures like wide-angle photography, and a waterproof type "Fujicolor Quick Snap Waterproof" provided with a watertight case for underwater exposures.

A user of the photo film unit winds the photo film frame by frame back into a cassette after each exposure. When the entirety of the photo film is exposed, the exposed photo film with the cassette is unloaded from the photo film unit. While the photo film is developed, the emptied photo film unit is discarded as waste. However, the huge amount of collectively created waste is a social problem in the environmental point of view. To reduce such waste, photo film units emptied of photo films are to be recycled.

In the recycling of photo film housings of the photo film units, the housings are classified into respective particular models, and then subjected to inspection of performance of taking exposures in view of reuse for photography. The used housings detected as acceptable are reloaded with new photo films, and packaged to be shipped newly as merchandise.

The above-mentioned plural variants of photo film units are collectively withdrawn by a manufacturer. It is general in a factory that operators manually classify the housings into the respective particular models. However, there is a problem in manual classification of photo film units has a limit in reliability and/or simplifying improvement, in view of raising efficiency in the recycling of the photo film units for the purpose of reuse of mechanisms for exposures.

SUMMARY OF THE INVENTION

In view of the foregoing problems, an object of the present invention is to provide a lens-fitted photo film unit and classifying apparatus and method for the same, in which the classification is facilitated and raised in efficiency.

In order to achieve the above and other objects and advantages of this invention, a lens-fitted photo film unit includes a housing which incorporates an exposure device and is pre-loaded with photo film, and a packaging for covering the housing. An identification sign is disposed outside the housing in externally readable fashion, and signals information of one kind of the housing.

In classification of the photo film unit, the packaging cardboard is removed from the housing. The identification sign is read, to detect the one kind of the housing. Plural downstream paths are disposed and respectively associated with the kinds of the housing. The housing is transferred to one of the downstream paths in association with the detected one kind.

The entirety of the recycling line can be automated. Each lens-fitted photo film unit can be classified with great efficiency and reliability.

In a preferred embodiment, the identification sign includes a combination of first and second patterns different in optical reflectance from one another. The combination constitutes the information of the one kind of the housing. The first pattern is a smooth face formed on the housing, and the second pattern is a rough face formed on the housing.

Preferably, the arithmetical mean deviation of profile of the smooth and rough faces is 0.1 μm or more. Arithmetical mean deviation of profile of the rough face is at least two times as great as arithmetical mean deviation of profile of the smooth face.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
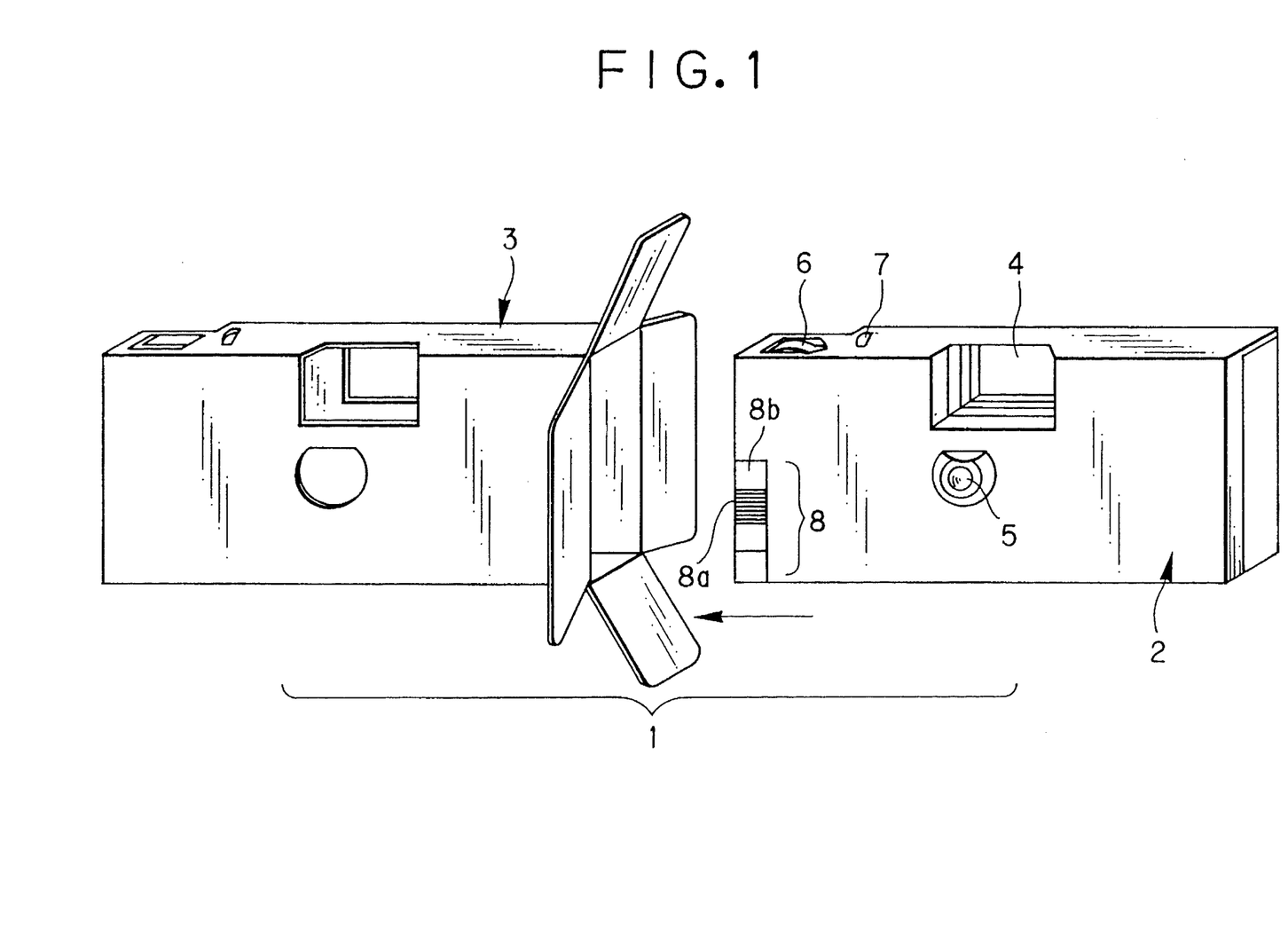
FIG. 1 is a perspective view illustrating a lens-fitted photo film unit of the present invention.

FIG. 1 illustrates a novel lens-fitted photo film unit 1. A photo film housing 2 is generally formed from resin, and packaged in a packaging cardboard 3. The housing 2 has a viewfinder 4, a taking lens 5, a shutter button 6, and an indicator 7 which shows the number of remaining frames photographable on photo film 15 (see FIG. 2). In correspondence with those outside the housing 2, the packaging cardboard 3 has openings in which they appear. One lower corner on the front of the housing 2 is provided with an identification sign 8 which represents information in the form of code. The identification sign 8 is constituted of four aligned digits, which are respectively either one of a rough face 8a and a flat or smooth face 8b having high smoothness. The rough face 8a has optical reflectance lower than the smooth face 8b.

Figure 2:
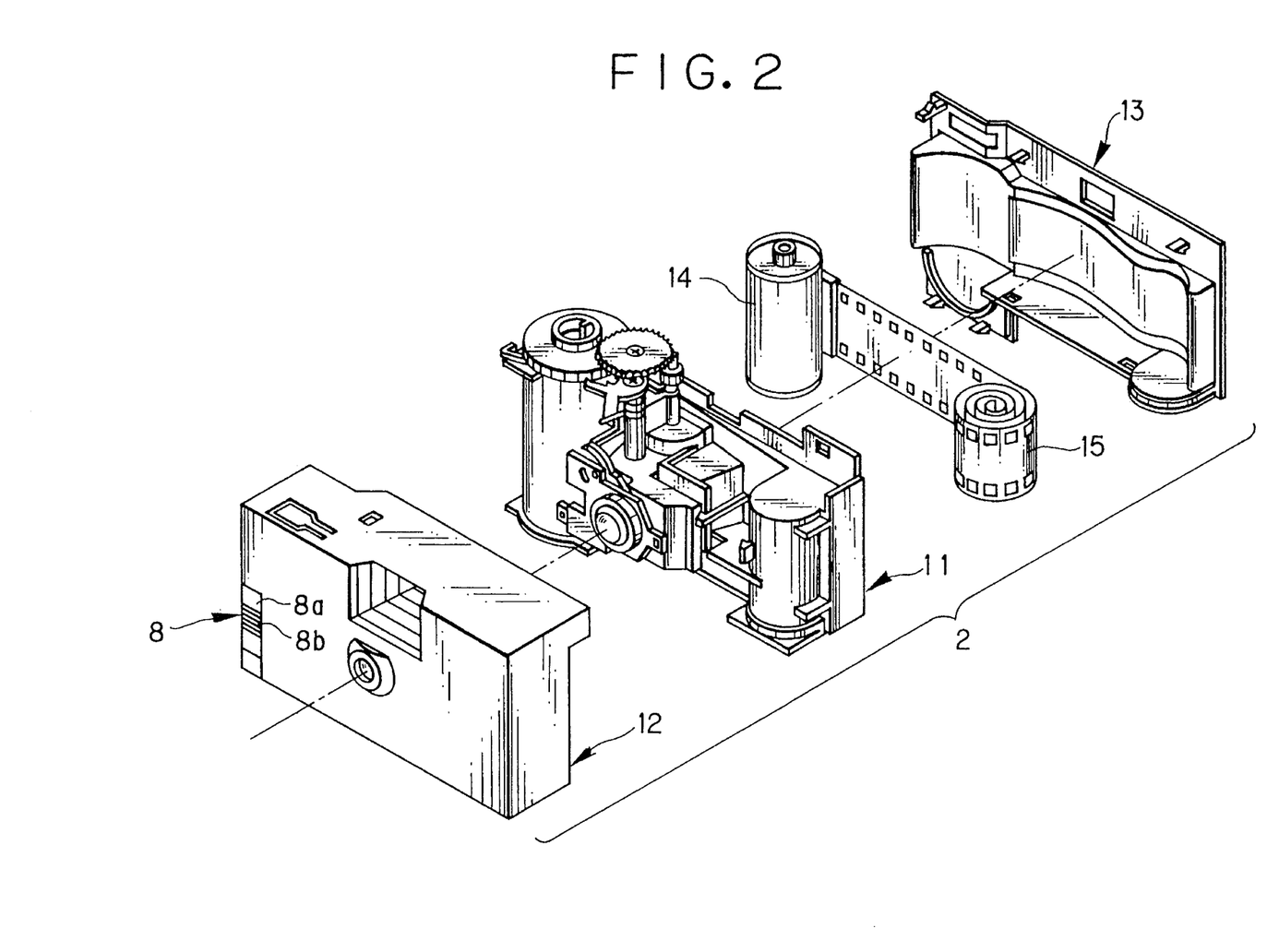
FIG. 2 is an exploded perspective view illustrating a photo film housing of the photo film unit illustrated in FIG. 1.

In the exploded view of FIG. 2, the housing 2 is constituted of a main body 11, with front and rear covers 12 and 13 secured thereto through hooking structures. The housing 2 pre-contains the photo film 15 and a cassette 14. When the housing 2 is loaded with the photo film 15, the photo film 15 is drawn out of the cassette 14 to be a roll inside the housing 2. The main body 11 has a cassette containing chamber 16 containing the cassette 14, and a photo film chamber 17 containing the roll of the photo film 15. A user of the photo film unit 1 winds the photo film 15 frame by frame back into the cassette 14 after each exposure. The front cover 12 has holes for the viewfinder 4, the taking lens 5 and the indicator 7. A portion of the front cover 12 consists in the shutter button 6. Also the identification sign 8 is formed integrally with the front cover 12.

Figure 3A:
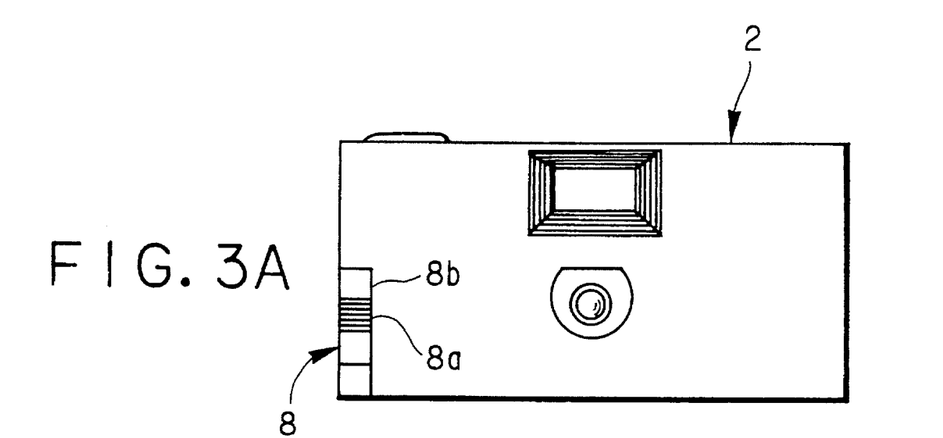
FIGS. 3A to 3C are front elevations illustrating housings respectively of a standard type, a flash-built-in type, and a panoramic type.
Figure 3B:
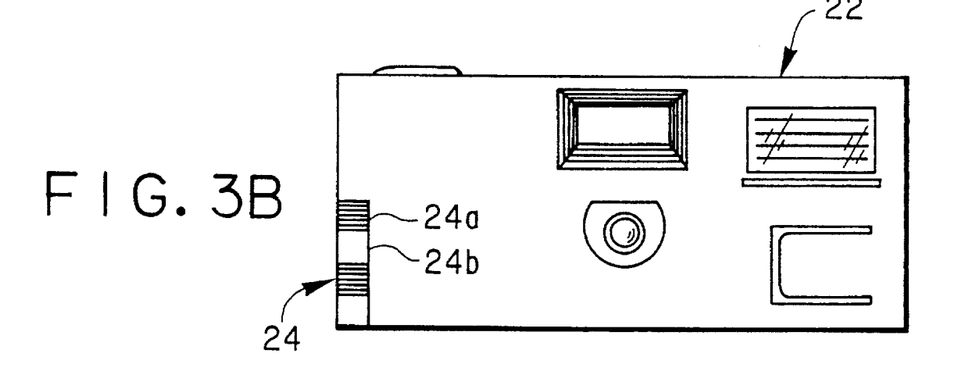
Figure 3C:
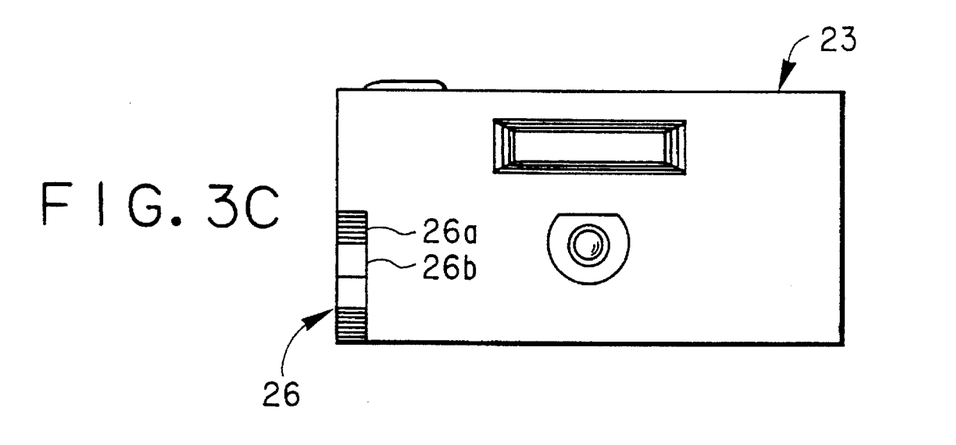

FIGS. 3A to 3C illustrate variants of photo film units. FIG. 3A illustrates the housing 2 of a standard type of photo film unit, which has the identification sign 8 constituted of the smooth face 8b, the rough face 8a, the smooth face 8b, and the rough face 8a, in the order downward. FIG. 3B illustrates a housing 22 of a flash-built-in type, which has an identification sign 24 constituted of a rough face 24a, a smooth face 24b, a rough face 24a, and a smooth face 24b, in the order downward. FIG. 3C illustrates a housing 23 of a panoramic type for exposures like wide-angle photography, which has an identification sign 26 constituted of a rough face 26a, a smooth face 26b, a smooth face 26b, and a rough face 26a, in the order downward.

Figure 4:
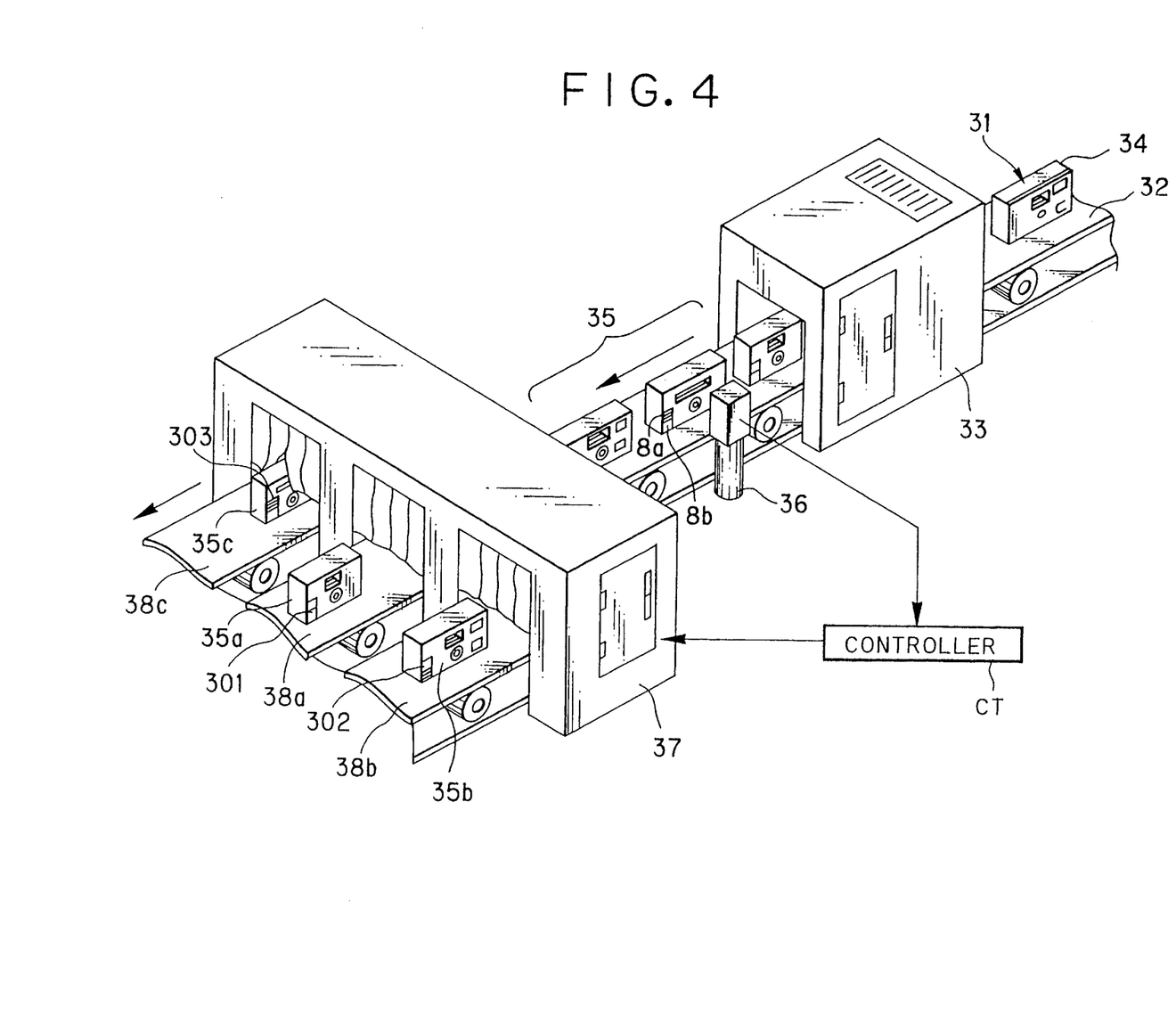
FIG. 4 is a perspective view illustrating an apparatus for classifying photo film units in accordance with the present invention.

The operation of the embodiment will be described now. FIG. 4 illustrates a line for classifying used photo film units emptied of exposed photo films, for the purpose of recycling the photo film units. A collection of photo film units 31 are withdrawn, and include plural types. The photo film units 31 are placed on a conveyor belt 32, and transported into a peeling apparatus 33, which peels packaging cardboards 34 from housings 35. Identification signs 301 to 303 appear on the peeled housings 35.

The conveyor belt 32 moves the housings 35 in front of a reader section 36 including a photo sensor. In reading the identification signs 301 to 303 at the reader section 36, light reflected on the rough faces and the smooth faces is checked. The digital arrangement in reflected light having a difference in intensity is decoded in a controller CT to obtain the information of the housing kind, on the basis of which a trigger signal is sent into a transfer device 37 for classification. Each of the identification signs 301 to 303 has two digits. A housing 35a is of the standard type of photo film unit, and has the identification sign 301 constituted of two smooth faces. A housing 35b is of the flash-built-in type, and has the identification sign 303 constituted of a smooth face and a rough face in the order downward. A housing 35c is of the panoramic type for exposures like wide-angle photography, and has the identification sign 302 constituted of a rough face and a smooth face in the order downward.

The conveyor belt 23 transports the housings 35 from the reader section 36 to the transfer device 37. When a trigger signal related to the identification sign 301 is received, then the transfer device 37 transfers the housing 35a of the standard type on to a conveyor belt 38a, which is adapted to a recycling line for photo film units of the standard type. When a trigger signal related to the identification sign 302 is received, then the transfer device 37 transfers the housing 35b of the flash-built-in type on to a conveyor belt 38b, which is adapted to a recycling line for photo film units of the flash-built-in type. When a trigger signal related to the identification sign 303 is received, then the transfer device 37 transfers the housing 35c of the panoramic type on to a conveyor belt 38c, which is adapted to a recycling line for photo film units of the panoramic type.

EXAMPLES

Figure 5:
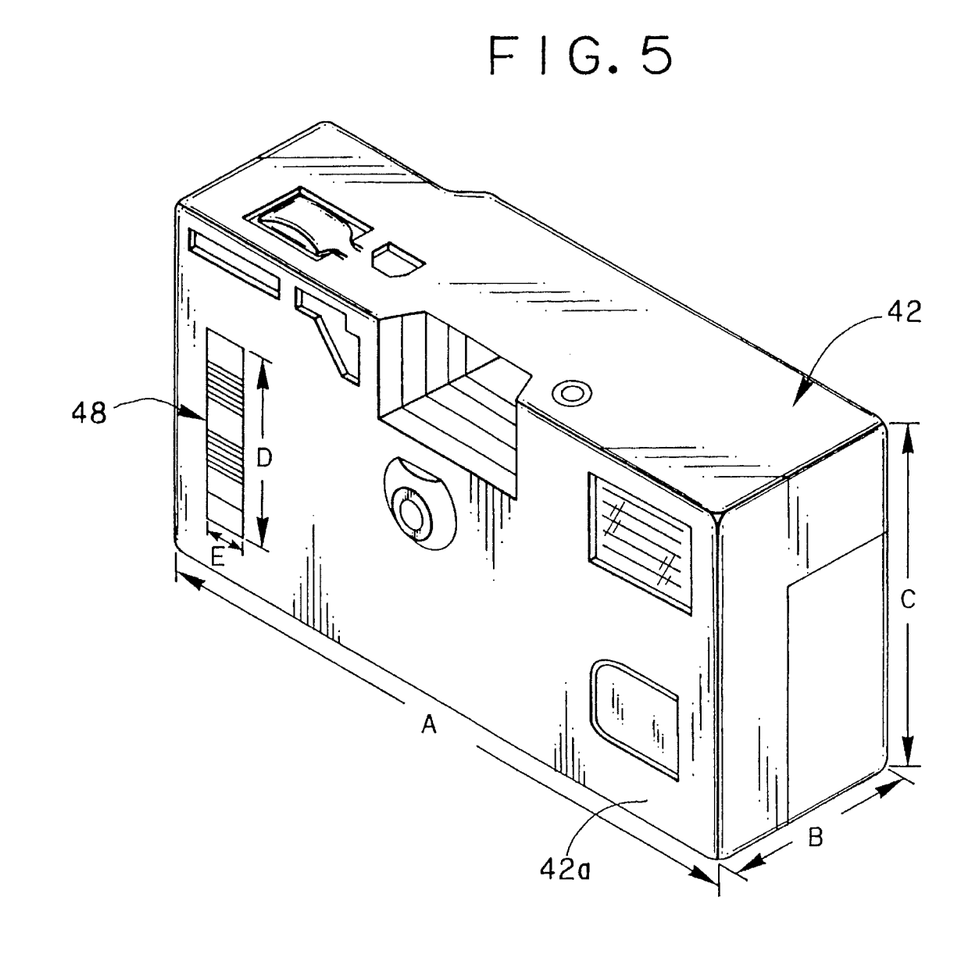
FIG. 5 is a perspective view illustrating an embodiment of photo film housing according to the present invention.
Figure 6A:
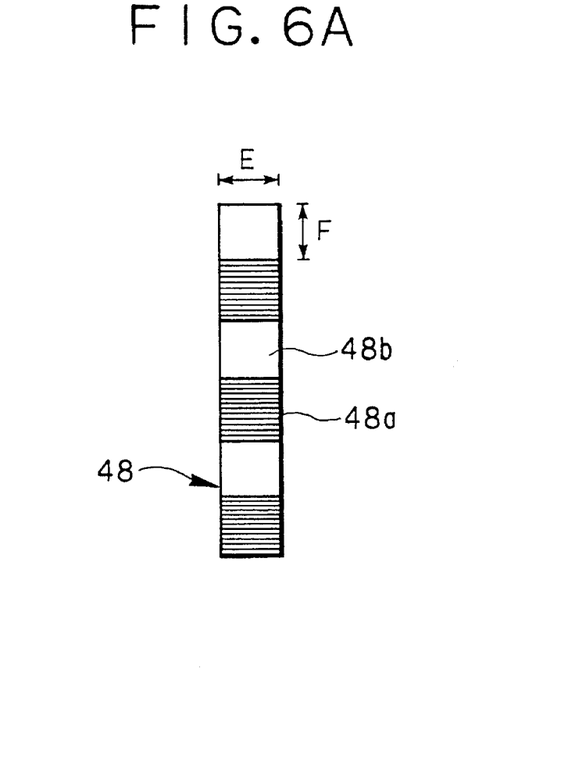
FIGS. 6A and 6B are explanatory views illustrating embodiments of identification signs, one with one column of digits, and another with two columns of digits.
Figure 6B:
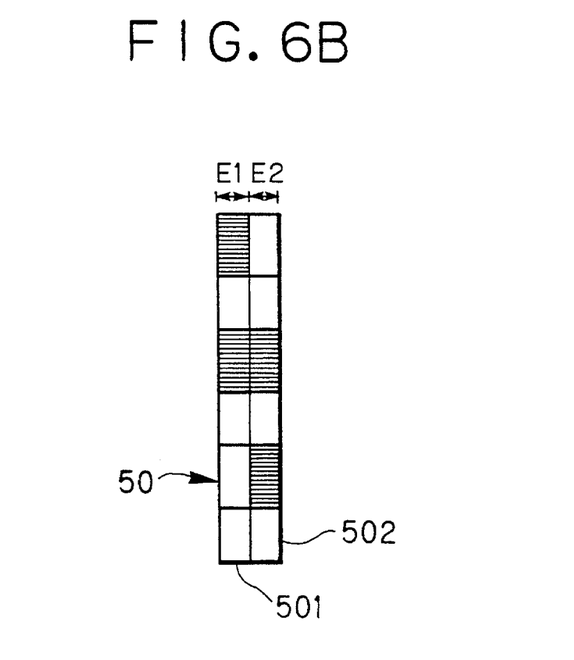

Experiments were conducted regarding a housing 42 as illustrated in FIGS. 5, 6A and 6B. In FIG. 5, the housing 42 had an identification sign 48, and had such a dimension that A=110 mm, B=25 mm, C=55 mm, D=24 mm and E=4 mm. In FIG. 6A, the identification sign 48 was formed as E=4 mm and F=4 mm. In FIG. 6B, an identification sign 50 had columns 501 and 502. The column 501 was used as a code designating at least one mold for forming a part included in the housing 42, for example a front cover 42a. The column 502 was used as a code designating the kind of the photo film unit. The identification sign 50 was formed as E1=E2=2 mm. An arithmetical means deviation of profile was checked as index of surface roughness. An arithmetical mean deviation of profile of a smooth face 48a was 1.4 µm. An arithmetical mean deviation of profile of a rough face 48b was 0.08 µm. Each of the smooth and rough faces included in identification signs was picked up by a CCD (charge coupled device) camera, which detected the intensity of light reflected by each face.

Figure 7:
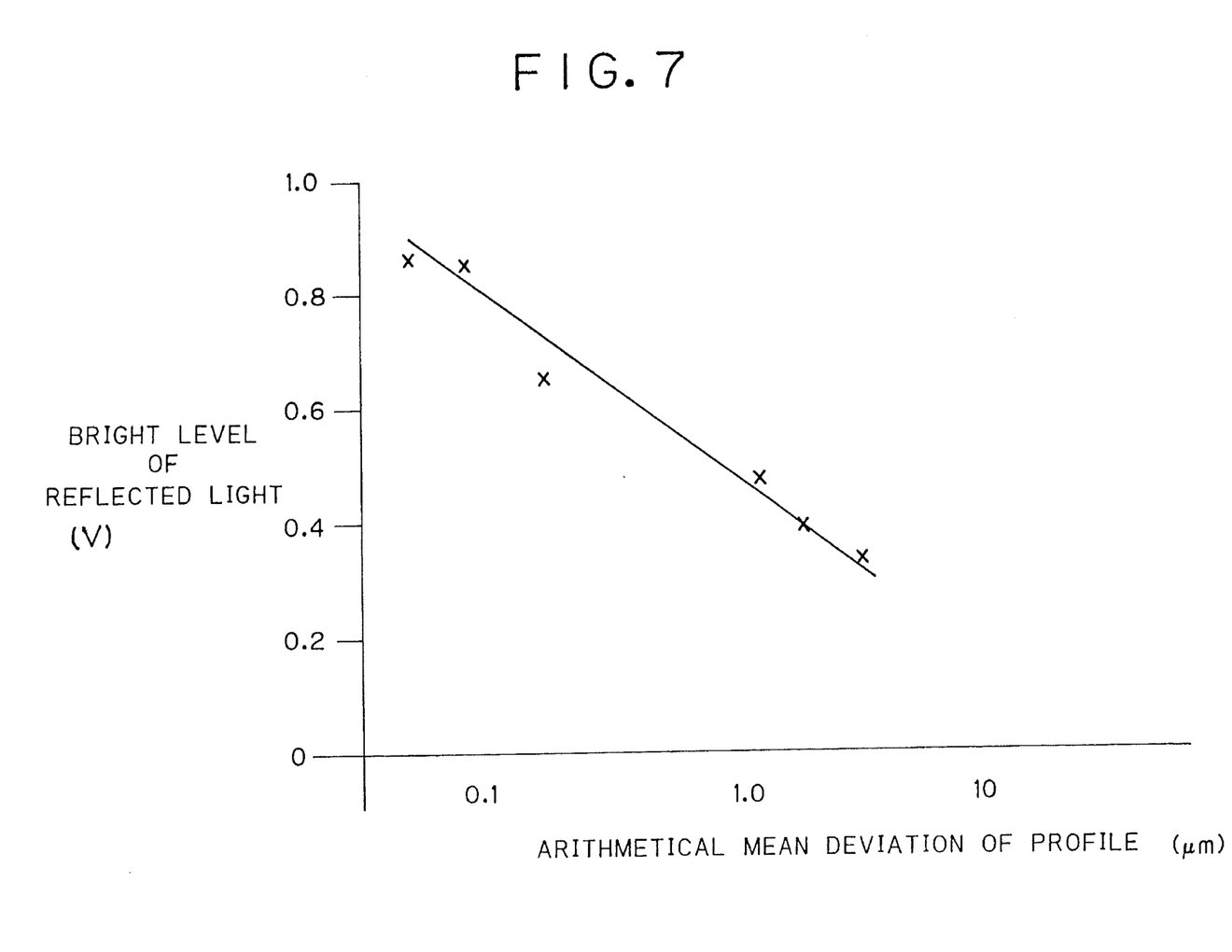
FIG. 7 is a graph illustrating a bright level of light reflected on the digits, at smooth and rough faces.

A graph of FIG. 7 illustrates a relationship between the surface roughness and the level of being bright at each face as detected at the CCD camera. A lower critical value was checked for a surface roughness of the rough face 48b. A lower critical ratio in surface roughness was checked between the smooth and rough faces 48a and 48b. It was found that the condition of great certainty in discernment of rough faces from smooth faces was a combination of determination of 0.1 µm or more for the arithmetical mean deviation of profile of the smooth and rough faces, and determination of the arithmetical mean deviation of profile of each rough face 48b at least two times as great as the arithmetical mean deviation of profile of each smooth face 48a.

As described above, the housing 2, 22, 23, 35a to 35c, 42 of the photo film unit 1, 31 is provided with the identification sign 8, 24, 26, 48, 50, 301 to 303, which is readable to the reader section 36 photoelectrically. Therefore, the kind of the housing can be detected easily and also automatically. Operators' visual discernment of the kinds of the photo film units is omitted from the classifying line of photo film units. No error will take place in the classification of the photo film units.

In the above embodiment, the classifying line is adapted to handling of a great number of collectively withdrawn used photo film units of plural kinds, and is intended for the recycling of the photo film units. However, the present invention is also applicable to classifying photo film units newly produced in manufacturing lines, for the purpose of preventing different photo film units from being mingled between the plural manufacturing lines.

The above identification sign 8, 24, 26, 48, 50, 301 to 303 have the two, four, or six digits, and have the one or two columns. However, the numbers of digits and columns are changeable as desired for respective purposes. In the above, the digits are arranged at the lower corner on the front of the housing, and aligned along a shorter edge of the housing. Alternatively, an identification sign may have digits aligned in a longitudinal direction of a housing, or digits arranged at an upper corner of a housing, or digits arranged on the rear, top, or bottom of a housing.

In the above, the identification signs and their digits have the rectangular or square shapes, and have binary forms. Alternatively, an identification sign may be formed to have a bar code, a pattern of a numeral in decimal fashion, and a CALRA code. In the above, the identification signs are formed integrally with the front cover. Alternatively, a separate identification member may be prepared and secured to an edge of a front cover of a housing. An identification sticker or the like may be attached on the housing. The sticker may have a pattern of a decimal numeral.

In the above, the identification sign is so formed as to change the roughness and optical reflectance between the smooth and rough faces, and detectable to the photo sensor. Alternatively an identification sign may be a combination of projections and recesses defined by stepped faces formed on a housing, and may be detectable to a contact sensor or a brush device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An apparatus for classifying plural kinds of a lens-fitted photo film unit including a housing which incorporates an exposure device and is pre-loaded with photo film, and a packaging cardboard for covering said housing;

wherein an identification sign is disposed outside said housing in externally readable fashion, for signaling information of one kind of said housing;

said classifying apparatus comprising:

a removing device for removing said packaging cardboard from said housing;

a reading device, disposed downstream of said removing device, for reading said identification sign to detect said one kind of said housing;

plural downstream paths, disposed downstream of said reading device, and respectively associated with said kinds of said housing; and a transfer device, disposed between said reading device and said downstream paths, for transferring said housing to one of said downstream paths in association with said detected one kind.

2. A classifying apparatus as defined in claim 1, wherein said identification sign includes a combination of first and second patterns different in optical reflectance from one another, and said combination constitutes said information of said one kind of said housing, and said reading device includes a photo sensor, and reads said identification sign optically.

3. A method of classifying plural kinds of a lens-fitted photo film unit including a housing which incorporates an exposure device and is pre-loaded with photo film, and a packaging cardboard for covering said housing, said classifying method comprising steps of:

disposing an identification sign outside said housing in externally readable fashion, to signal information of one kind of said housing, removing said packaging cardboard from said housing;

reading said identification sign, to detect said one kind of said housing;

disposing plural downstream paths respectively associated with said kinds of said housing; and transferring said housing to one of said downstream paths in association with said detected one kind.

4. A classifying method as defined in claim 3, wherein said identification sign includes a combination of first and second patterns different in optical reflectance from one another, and said combination constitutes said information of said one kind of said housing, and said identification sign is read optically.

* * * * *